Figure 1:
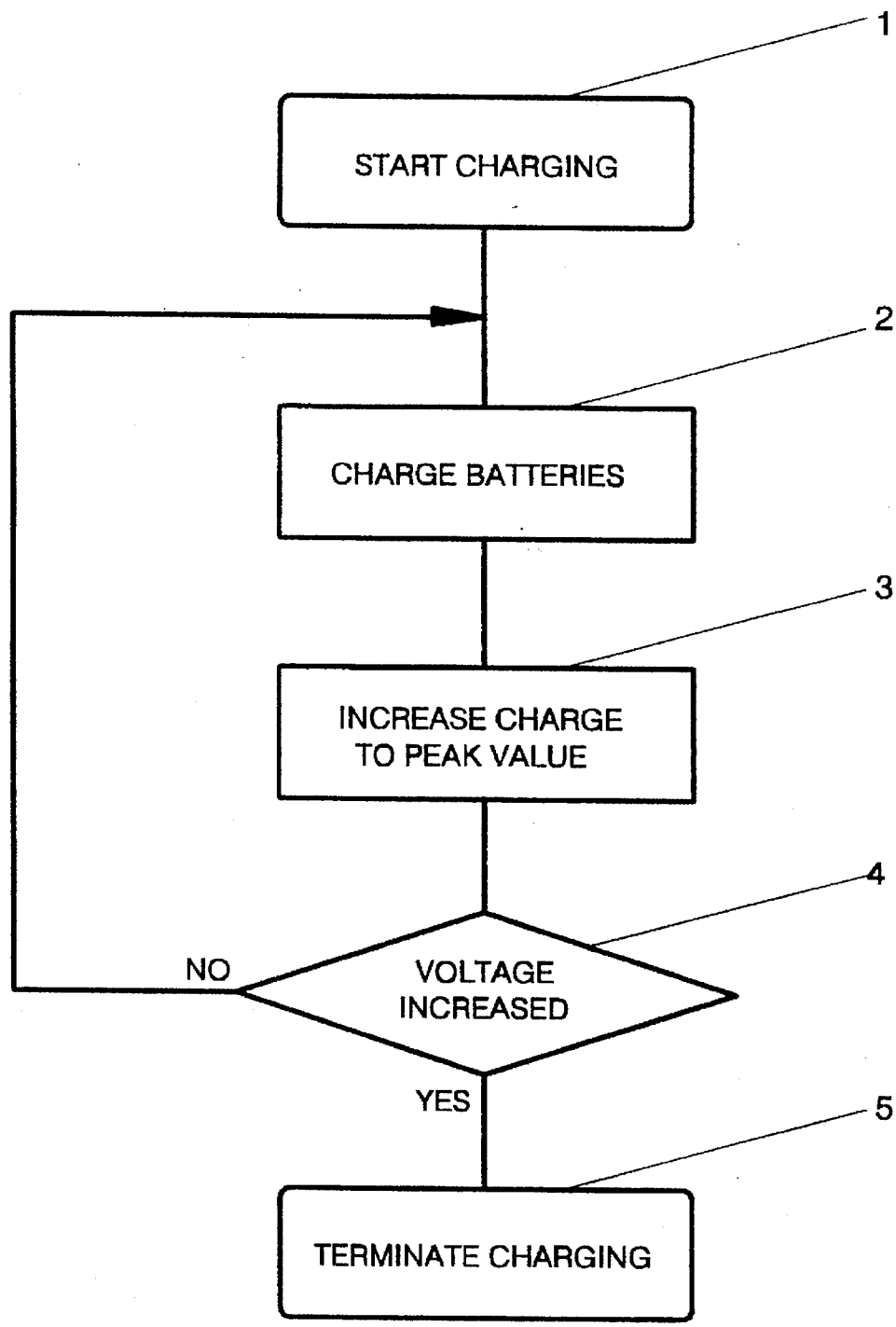

United States Patent [19]

Naskali

[11] Patent Number: 5,625,274
[45] Date of Patent: Apr. 29, 1997

[54] METHOD FOR FAST CHARGING OF DIFFERENT TYPES OF BATTERIES

[75] Inventor: Matti Naskali, Yliskulma, Finland

[73] Assignee: Nokia Mobile Phones Limited, Salo, Finland

[21] Appl. No.: 555,206

[22] Filed: Nov. 8, 1995

[30] Foreign Application Priority Data

Nov. 11, 1994 [FI] Finland ................... 945309

[51] Int. Cl.$^6$ ................................ H01M 10/44
[52] U.S. Cl. .................................... 320/23
[58] Field of Search ................ 320/20, 21, 22, 320/23

[56] References Cited

U.S. PATENT DOCUMENTS

| | | | |
|---|---|---|---|
| 4,306,183 | 12/1981 | Wright | 320/39 |
| 4,992,720 | 2/1991 | Hata | 320/23 |
| 5,177,427 | 1/1993 | Bugaj | 320/20 |
| 5,206,579 | 4/1993 | Kawate et al. | 320/20 |
| 5,225,763 | 7/1993 | Krohn et al. | 320/23 |
| 5,350,995 | 9/1994 | Iketani | 320/15 |
| 5,350,996 | 9/1994 | Tauchi | 320/22 |
| 5,449,996 | 9/1995 | Matsumoto et al. | 320/20 |
| 5,467,005 | 11/1995 | Matsumoto et al. | 320/20 |
| 5,489,836 | 2/1996 | Yuen | 320/20 X |
| 5,537,023 | 7/1996 | Hanselmann et al. | 320/22 |

FOREIGN PATENT DOCUMENTS

| | | |
|---|---|---|
| 0479248A3 | 4/1992 | European Pat. Off. . |
| 0623987A1 | 11/1994 | European Pat. Off. . |
| 0667667A2 | 8/1995 | European Pat. Off. . |
| WO92/09130 | 5/1992 | WIPO . |

*Primary Examiner*—Peter S. Wong
*Assistant Examiner*—Patrick B. Law
*Attorney, Agent, or Firm*—Perman & Green

[57] ABSTRACT

The invention relates to a method for terminating the charging of a battery, in which a certain decrease in the battery voltage is detected when the battery is fully charged and the charge begins to decrease. With the invention it is possible to prevent battery overcharge reliably and efficiently. The solution can be applied to the charging of both Ni—Cd and Ni—MH batteries with a same charger and/or same charge control program.

8 Claims, 3 Drawing Sheets

METHOD FOR FAST CHARGING OF DIFFERENT TYPES OF BATTERIES

The invention relates to a method according to the preamble of claim 1 for fast charging of different types of chargeable batteries and particularly a method for terminating the charging of a battery when a certain decrease in the battery voltage is detected when the battery is fully charged and the charge begins to drop.

There are several known methods for charging rechargeable batteries like nickel-cadmium (Ni—Cd) batteries. Batteries are often charged with separate chargers; e.g. with desktop chargers intended for charging batteries of mobile stations/mobile telephones. In some cases it is felt that removing the batteries from the telephone for the charging is inconvenient because then the telephone cannot be used during the charging. However, there are several different chargers that can be attached to a battery-operated device to charge the batteries while they are in the device, e.g. in a mobile telephone. Thus, the telephone can be used during the charging of the batteries.

Before, there was the problem that chargers used rather small charge currents and a battery-operated device had to be out of use quite a long time, say, eight hours or more, while the batteries were being charged. For this reason, it has been developed rapid chargers that are capable of charging batteries in quite a short time, in ½ to 3 hours.

Several problems had to be solved in order to facilitate rapid charging. One of the biggest problems was the overcharging of batteries which leads to overheating of batteries. Overheating damages the batteries in long term and the overcharge may cause the battery cell to vent.

In known rapid chargers, most of these problems have been solved by monitoring certain parameters of the battery, like the charge and internal temperature of the battery. Some rapid chargers attempt to prevent battery overcharge by applying a certain limited charging time in the charger. This, however, cannot prevent battery overcharge. Hence, the problem is how to stop charging at the right moment when the battery is fully charged.

One of the most widely known methods for terminating the charging of a battery is the so-called $-\Delta V$ method, ie. the negative delta voltage method. It has been used with a relatively good success for Ni—Cd batteries. In this method a battery is charged with a constant current until the voltage of the battery reaches its peak value and begins to drop. This voltage drop caused by overcharge is typical for a fully charged Ni—Cd battery, it can be detected and therefore it can be used as a criterion for terminating the charging. In many applications, the predetermined voltage drop for a nickel-cadmium battery is set at 20 mV, which then is the criterion mentioned above. This method is illustrated in FIG. 1.

In step 1 of FIG. 1 the charging of a battery is started. In step 2, the charging continues and in step 3 the charge is increased to the peak value. In step 4, it is monitored whether the voltage of the battery has begun to decrease. If that is not the case, charging continues. If the voltage has decreased, ie. a predetermined drop $-\Delta V$, say, $-20$ mV, is detected, the charging is terminated in step 5.

Nowadays, Ni—MH batteries are becoming popular. The difference between Ni—Cd and Ni—MH batteries is that in a Ni—MH battery the voltage drop caused by overcharge is quite small, considerably smaller than that of a Ni—Cd battery. In order to enable charging of Ni—MH batteries with a charger that has been used to charge Ni—Cd batteries, said predetermined voltage drop value $(-\Delta V)$ has to be set rather low. This makes the detector very sensitive to disturbances. Disturbances may be caused by external electric fields, temperature, etc. In addition, there may occur a voltage drop in the middle of charging, as a typical characteristic of the battery. So there is the risk that charging is prematurely terminated before the battery is fully charged, even in the beginning of charging.

Figure 2:
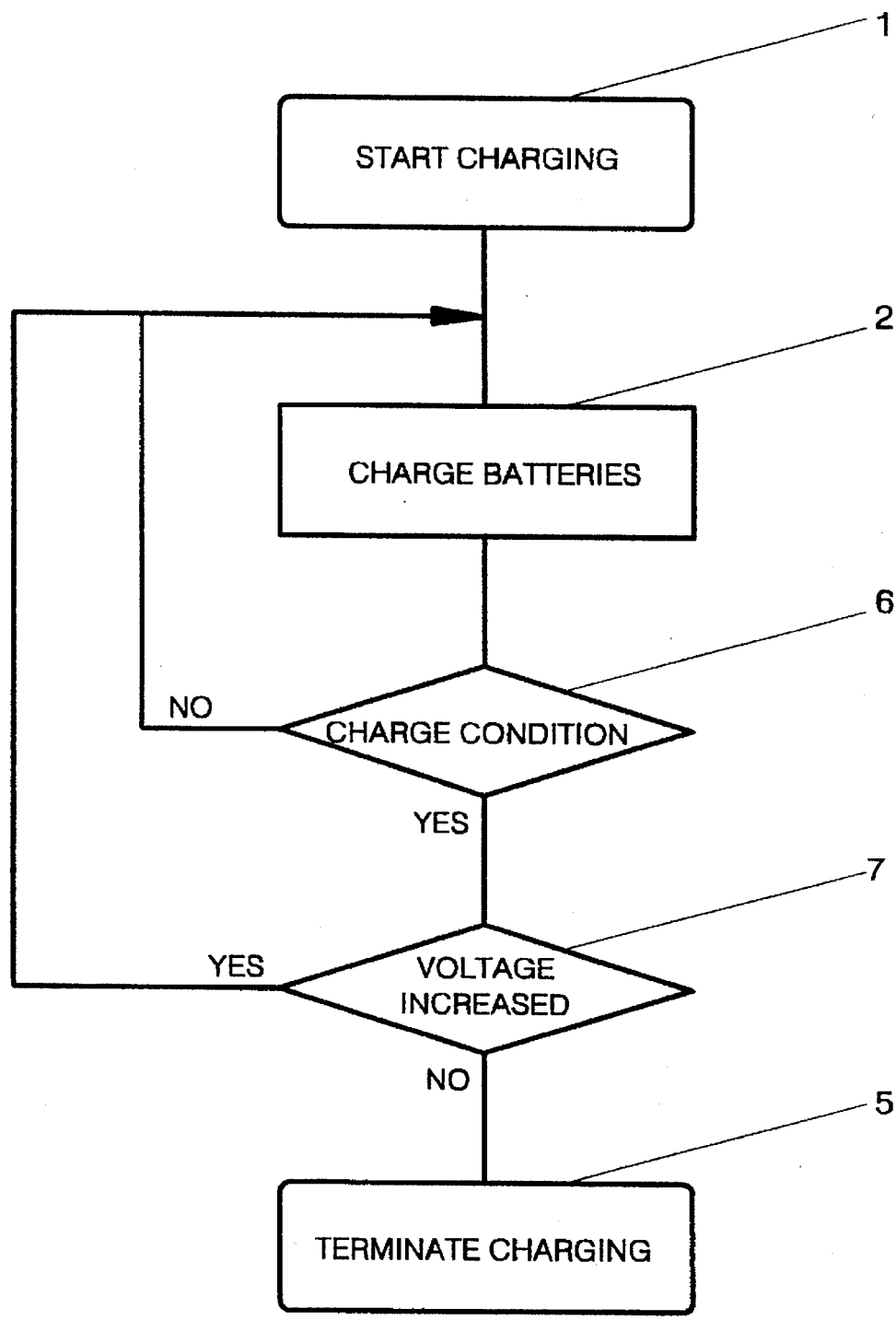

Another known method for the termination of charging is to use peak value detection. FIG. 2 presents a flowchart for a charging method utilizing such known technique. First, the charging of a battery is started in step 1, then the battery is being charged in step 2 until a certain charge condition has been met in step 6, e.g. the charge level of the battery has increased by 5%. Next, the charge of the battery is checked in step 7 and when the charge has stopped increasing it is assumed that the battery is fully charged and a decision is made in step 5 to stop the charging.

In the method illustrated in FIG. 2, the period of time over which the voltages are compared has to be long enough. The voltage of Ni—Cd and Ni—MH batteries increases until the battery reaches full charge. However, the voltage increase is rather small in the mid-stages of charging. According to measurement results, it then easily seems that the voltage has remained the same or even decreased, especially when disturbances affect the measurement results, as was stated before, in connection with FIG. 1. Therefore, the peak detection comparison time has to be long enough lest the charging be terminated too soon. Then a disadvantage of the method is that when the battery is fully charged, the charging must be continued in excess of the comparison time so as to ensure full charge. This results in that the battery will be overcharged every time due to the long comparison time.

It is an object of the present invention to bring about a method for charging and particularly for terminating the charging of chargeable batteries, in which the problems described above can be avoided.

Accordingly, it is characteristic of the inventive method that a voltage drop $-\Delta V$ is detected, the length of the time over which the voltage drop is detected is measured, the voltage drop $-\Delta V$ is integrated over the measured time, the integration result is compared to a predetermined total value, and the charging of the battery is stopped when the integration result exceeds said total value. The method can be used for charging at least Ni—Cd and Ni—MH batteries with a same charger.

The method according to the invention can be used for charging and terminating the charging of batteries of mobile stations.

Below, the invention is described in detail, with reference to the enclosed drawings where FIGS. 1 and 2 illustrate the prior art methods described above and FIG. 3 shows a flowchart of a charging method according to the invention.

Figure 3:
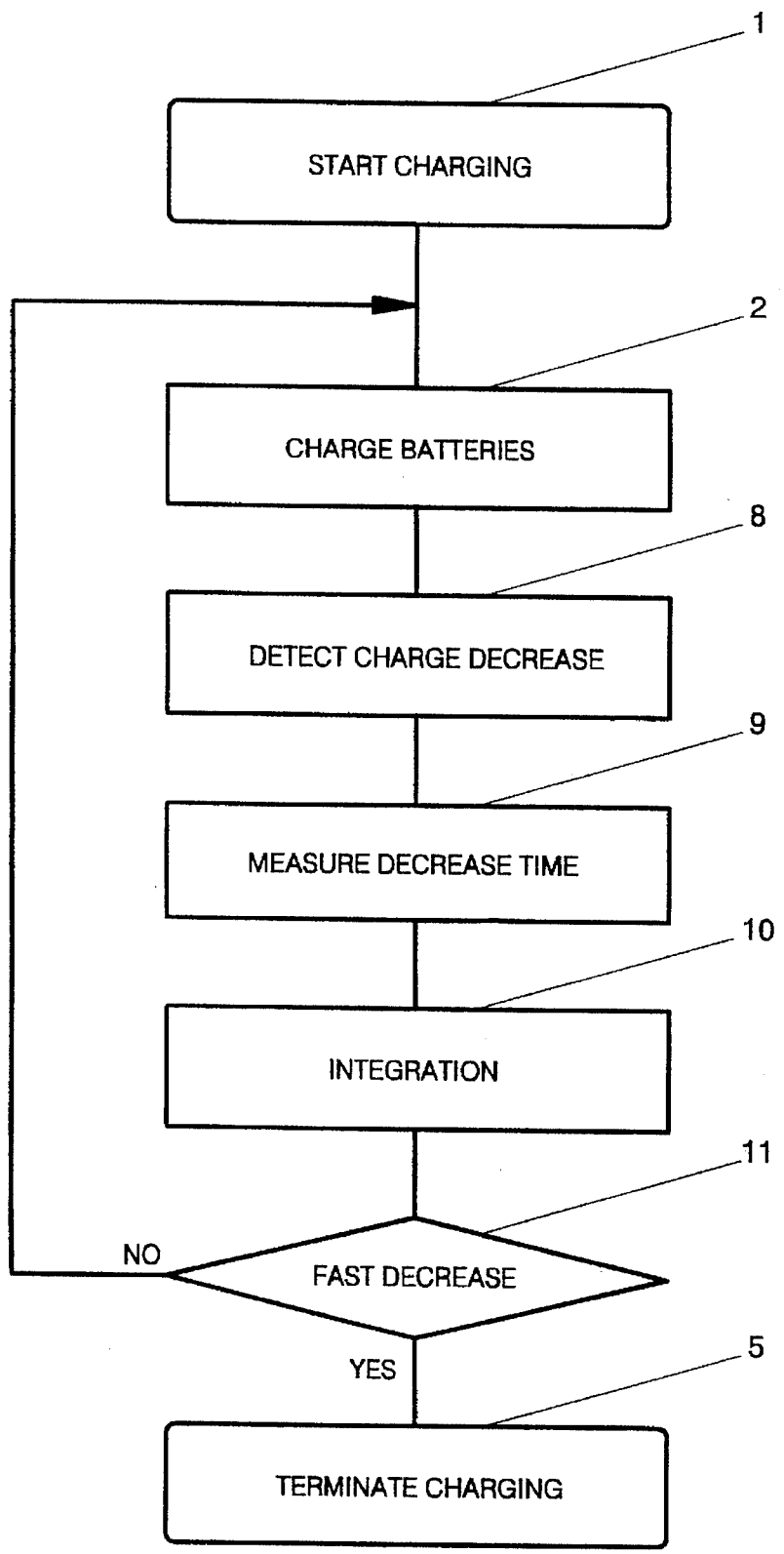

Below there follows a description of a solution according to the invention with reference to FIG. 3 which illustrates the implementation of a solution according to the invention in the form of a simplified flowchart.

In the new method, charging is first started in step 1, after which the battery is being charged in step 2. When the battery is fully charged and the charge begins to decrease, the decrease is detected according to the invention as a voltage drop $-\Delta V$ in the charge decrease detection step 8. Next, the time during which the charge decrease is detected is measured in step 9. After that, the measured voltage drop $-\Delta V$ is integrated over the measured decrease time in step 10. Next, the integration result is considered in step 11, ie. it is compared to a predetermined total value. If the integration result exceeds said total value in step 11, charging will be terminated in step 5. This means that the drop of the battery voltage has been rapid enough and it is assumed that the battery is fully charged. If the integration result does not exceed said total value in step 11, it is returned to step 2, ie. charging is continued. In addition, integrating is continued only for a predetermined observation period and if the integration result does not reach said total value within the observation period, integrating will be stopped since it then can be assumed that the detected drop was caused by an external disturbance or an internal phenomenon in the battery. In this situation, charging is continued and integration will be started again when a new predetermined drop is detected.

The idea of the solution according to the invention is to detect a predetermined voltage drop as small as possible and integrate it over the measured period of time. If the voltage drop is very small, near zero, it cannot be determined with certainty in prior art solutions whether the voltage drop was caused by an external disturbance or some other instability in the battery voltage curve. In the solution according to the invention, it is obtained by means of integration in step 10 the voltage drop rate with the help of which it is made a decision in step 11 on the termination of charging, after which the charging is terminated in step 5. If the $-\Delta V$ is less pronounced the lower is the relative charging current. With this solution also larger batteries and/or smaller charging currents can be used without any charge to present values.

With the solution according to the invention it is possible to prevent battery overcharge reliably and efficiently. The advantage of the solution is that the integration time can be relatively short and hence the overcharge remains quite small. On the other hand, the same predetermined drop can be applied to the charging of both Ni—Cd and Ni—MH batteries with a same charger and/or same charge control program.

I claim:

1. A method for charging a battery wherein the charging of the battery voltage is terminated when the battery is fully charged and the voltage of the battery begins to decrease, comprising the steps of:

step 1, a voltage decrease $-\Delta V$ of a battery;

step 2, measuring 9 length of the time during which the voltage decrease is detected, step 3, integrating the detected voltage decrease $-\Delta V$ over the measured length of time of step 2, step 4, comparing the integrated detected voltage decrease of step 4 to a predetermined total value, and step 5, terminating the charging of the battery when the integrated detected voltage decrease exceeds the predetermined total value.

2. The method of claim 1, characterized in that the predetermined total value to be detected is selected to equal the smallest possible voltage decrease $-\Delta V$ that can be detected.

3. The method of claim 1, characterized in that, in addition, the integrating of step 3 is continued only for a predetermined observation period and if the integrating result does not reach said total value within the observation period, the integrating is stopped and will be started again from the beginning when a new predetermined decrease is detected (in step 1).

4. The method of claim 1, characterized in that the steps 1, 2, 3, 4, and 5 are applied for terminating the charging of different types of batteries.

5. The method of claim 4, characterized in that the steps 1, 2, 3, 4, and 5 are used to charge at least Ni—Cd and Ni—MH batteries with a same charger and same charge control program.

6. The method of claim 4, characterized in that the steps 1, 2, 3, 4, and 5 are used to charge at least Ni-Cd and Ni-MH batteries with a same charger.

7. The method of claim 4, characterized in that the steps 1, 2, 3, 4, and 5 are used to charge at least Ni—Cd and Ni—MH batteries with a same charge control program.

8. The method of claim 1 for charging and terminating the charging of batteries contained in mobile stations.

* * * * *

UNITED STATES PATENT AND TRADEMARK OFFICE
CERTIFICATE OF CORRECTION

PATENT NO. : 5,625,274
DATED     : April 29, 1997
INVENTOR(S) : Naskali

It is certified that error appears in the above-identified patent and that said Letters Patent is hereby corrected as shown below:

In claim 1, col. 4, line 3, after "step 1," insert --detecting--.

Signed and Sealed this

Fifteenth Day of July, 1997

Attest:

BRUCE LEHMAN

Attesting Officer

Commissioner of Patents and Trademarks